(12) United States Patent
Suzuki et al.

(10) Patent No.: US 12,254,774 B2
(45) Date of Patent: Mar. 18, 2025

(54) SERVER, SYSTEM, AND INFORMATION PROCESSING METHOD

(71) Applicant: TOYOTA JIDOSHA KABUSHIKI KAISHA, Toyota (JP)

(72) Inventors: Hiroyuki Suzuki, Miyoshi (JP); Yoshinori Kanemitsu, Tachikawa (JP); Hirohiko Taniguchi, Yokohama (JP); Hirona Ota, Seto (JP); Yuki Tatsumoto, Seto (JP); Keiichi Uno, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 240 days.

(21) Appl. No.: 18/051,562

(22) Filed: Nov. 1, 2022

(65) Prior Publication Data
US 2023/0141167 A1    May 11, 2023

(30) Foreign Application Priority Data
Nov. 11, 2021 (JP) .................. 2021-184390

(51) Int. Cl.
*G08G 1/00* (2006.01)
*B60W 60/00* (2020.01)
(52) U.S. Cl.
CPC ........... *G08G 1/202* (2013.01); *B60W 60/001* (2020.02); *G08G 1/205* (2013.01); *B60W 2554/4041* (2020.02)
(58) Field of Classification Search
CPC .. G08G 1/202; G08G 1/205; G08G 1/096805; G08G 1/096816; G08G 1/096838; G08G 1/09685; G08G 1/096833; G08G 1/096708; G08G 1/096725; G08G 1/096775; B60W 60/001; B60W 60/0013; B60W 60/0021; B60W 60/0024; B60W 60/00253; B60W 2300/105; B60W 2540/041; B60W 2540/043; B60W 2540/045; B60W 2540/047; B60W 2540/221; B60W 2554/4041; G06Q 10/047; G06Q 10/0631; G06Q 10/06311; G06Q 10/1093; G06Q 10/1097; G16H 40/67; G16H 40/20; A61B 5/0002; A61B 5/0205;
(Continued)

(56) References Cited

U.S. PATENT DOCUMENTS

2010/0305966 A1* 12/2010 Coulter .................. G06Q 10/06
                                                        705/2
2017/0059337 A1*  3/2017 Barker ................. G06Q 10/047
(Continued)

FOREIGN PATENT DOCUMENTS

JP        2021022332 A    2/2021

*Primary Examiner* — Russell Frejd
*Assistant Examiner* — Brandon Z Willis
(74) *Attorney, Agent, or Firm* — SoraIP, Inc.

(57) ABSTRACT

A server includes: a communication device configured to acquire information on a user who is to receive a physical exam, the information including a residence of the user and an examination item of the user; and one or more processors configured to determine a travel schedule of a plurality of vehicles each configured to perform one or more of a plurality of the examination items of the physical exam, the travel schedule being a schedule for the vehicles that offer the examination items of a plurality of the users to travel around the residences of the users.

13 Claims, 9 Drawing Sheets

(58) Field of Classification Search
CPC .... A61B 5/6887; A61B 5/6893; A61G 3/001; A61G 3/00; A61G 2220/14; B60P 3/00
See application file for complete search history.

(56) References Cited

U.S. PATENT DOCUMENTS

| | | | |
|---|---|---|---|
| 2018/0182055 A1* | 6/2018 | Jepson | G06Q 20/102 |
| 2019/0193742 A1* | 6/2019 | Kanehara | B60W 40/08 |
| 2020/0117195 A1* | 4/2020 | Yasui | G16H 80/00 |
| 2021/0035038 A1 | 2/2021 | Suzuki et al. | |
| 2021/0035667 A1* | 2/2021 | Suzuki | G16H 50/20 |
| 2021/0074413 A1* | 3/2021 | Hayashitani | G16H 40/20 |
| 2022/0359068 A1* | 11/2022 | Abdulkarim | G16H 10/40 |

* cited by examiner

SERVER, SYSTEM, AND INFORMATION PROCESSING METHOD

CROSS-REFERENCE TO RELATED APPLICATION

This application claims priority to Japanese Patent Application No. 2021-184390 filed on Nov. 11, 2021, incorporated herein by reference in its entirety.

BACKGROUND

1. Technical Field

The present disclosure relates to servers, systems, and information processing methods, and more particularly to a server, system, and information processing method for determining a travel schedule for vehicles that provide a physical exam service to travel around users' residences.

2. Description of Related Art

A "physical exam" is essential for prevention and early detection of diseases. Companies usually provide employees with annual physical exams, and employees working for a company are in an environment with easy access to physical exams. On the other hand, those who do not work for a company or who are a dependent have a physical exam that is offered to family members of employees or a physical exam provided by a local government. Those who have such a physical exam usually go to a hospital or facility designated by a company or local government.

However, it is inconvenient to go to a distant hospital or facility for a physical exam, and those who do not work for a company often end up not having a physical exam for a long time. One proposed method to solve this problem is to send a vehicle equipped with equipment used for a physical exam to an area where users who have a physical exam live (see, e.g., Japanese Unexamined Patent Application Publication No. 2021-22332 (JP 2021-22332 A)). According to this method, the vehicle equipped with the equipment for a physical exam is parked in a place in the users' neighborhood, and the users can have a physical exam in this place.

SUMMARY

However, even when the vehicle equipped with the equipment for a physical exam is parked in the area where the users live, it is difficult for some of those who need nursing care, who are not in good health, etc. to move even a short distance. Moreover, some may feel it's a hassle to go to the place where the vehicle for a physical exam is parked to have a physical exam, even within the area where they live. Accordingly, they may end up not having a physical exam.

The present disclosure provides a server, system, and information processing method capable of providing a physical exam service with improved convenience to those who have a physical exam.

A server according to a first aspect of the present disclosure includes: a communication device configured to acquire information on a user who is to receive a physical exam, the information including a residence of the user and an examination item of the user; and one or more processors configured to determine a travel schedule of a plurality of vehicles each configured to perform one or more of a plurality of the examination items of the physical exam, the travel schedule being a schedule for the vehicles that offer the examination items of a plurality of the users to travel around the residences of the users.

A system according to a second aspect of the present disclosure includes: a plurality of vehicles each configured to perform one or more of a plurality of examination items of a physical exam; a communication device configured to acquire information on a user who is to receive the physical exam, the information including a residence of the user and the examination item of the user; and one or more processors configured to determine a travel schedule of the vehicles, the travel schedule being a schedule for the vehicles that offer the examination items of a plurality of the users to travel around the residences of the users.

An information processing method according to a third aspect of the present disclosure includes: acquiring information on a user who is to receive a physical exam, the information including a residence of the user and an examination item of the user; and determining a travel schedule of a plurality of vehicles each configured to perform one or more of a plurality of the examination items of the physical exam, the travel schedule being a schedule for the vehicles that offer the examination items of a plurality of the users to travel around the residences of the users.

The server, system, and information processing method of the present disclosure provide a physical exam service with improved convenience to those who have a physical exam.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, an embodiment of the present disclosure will be described in detail with reference to the drawings. The same signs represent the same or equivalent components throughout the figures.

Figure 1:
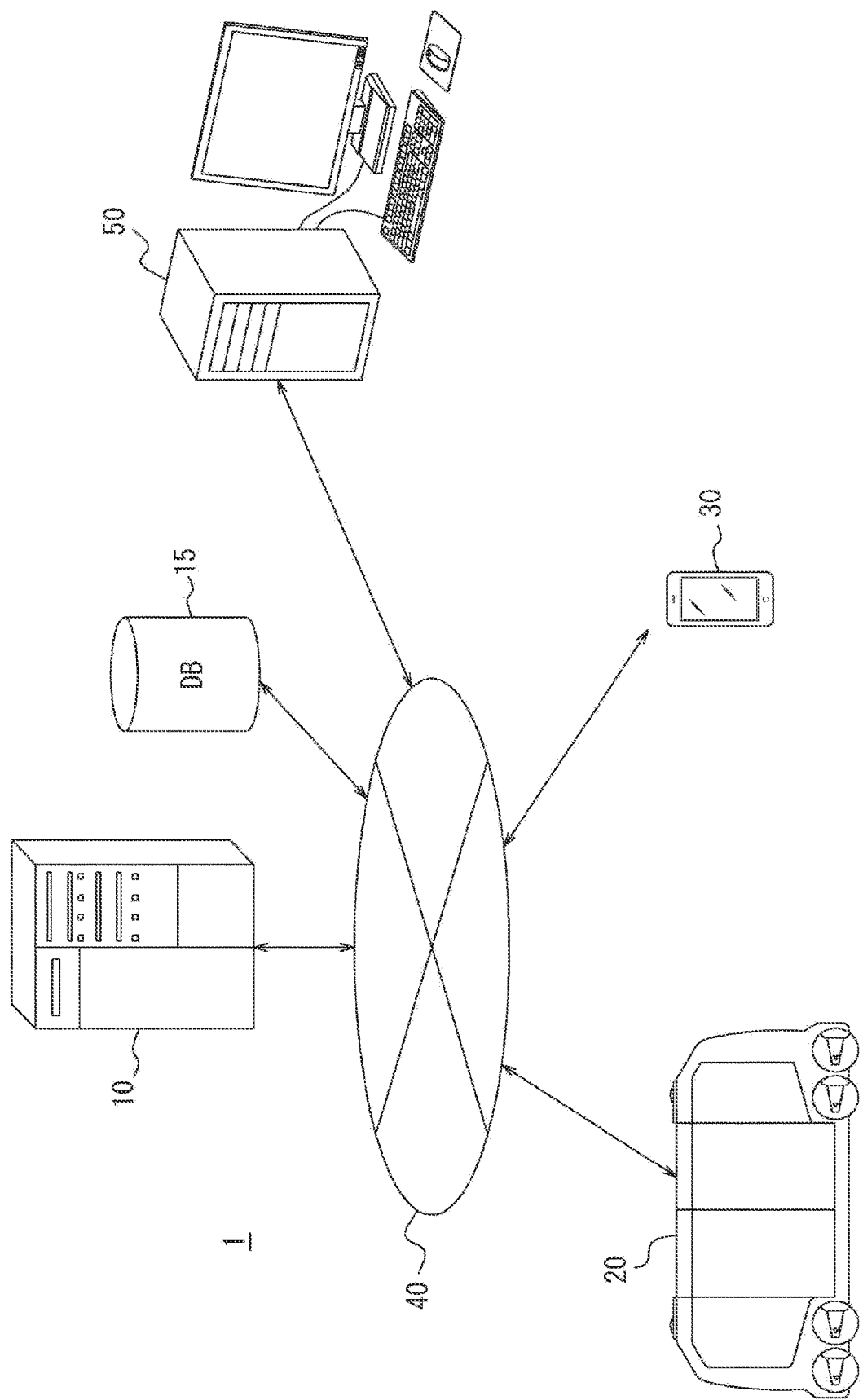
FIG. 1 shows an example of a configuration of a system according to an embodiment.

FIG. 1 shows an example of a configuration of a system 1 that provides a physical exam service according to an embodiment of the present disclosure. The system 1 according to the present embodiment includes a server 10, a vehicle 20, and a terminal device 30. The server 10, the vehicle 20, and the terminal device 30 are connected by a desired network 40 capable of information communication. In the system 1, a necessary database (DB) 15 is connected to the network 40. Although only one vehicle 20 and one terminal device 30 are shown in FIG. 1, a plurality of vehicle 20 and a plurality of terminal devices 30 are connected to the network 40. One or more remote computers 50 that are operated by healthcare workers such as doctors may be connected to the network 40. The remote computer 50 may be located in a health facility.

As an explanatory outline of the present disclosure, each vehicle 20 is equipped with equipment for performing an examination of one or more of a plurality of examination items of a physical exam. The examination items of the physical exam include measurements of height, weight, and waist circumference, vision test, hearing test, measurement of blood pressure, urine test, blood test, chest X-ray, abdominal X-ray, ultrasound, electrocardiogram, and health consultation. The equipment mounted on each vehicle 20 includes testing devices for performing an examination of the examination item(s) that is offered by that vehicle 20, and accessory equipment. The testing devices include, for example, a stadiometer, a weight scale, an optometer, an audiometer, a sphygmomanometer, a urine analyzer, a hematology analyzer, an X-ray diagnostic imaging system, an ultrasound imaging system, and an electrocardiograph. The accessory equipment includes, for example, a bed and a chair on which a person who has a physical exam lies or sits during an examination. The examination items of the physical exam may include various screenings such as a computed tomography (CT) scan, a head magnetic resonance imaging (MRI) scan, a mammogram, and a bone density test. Each vehicle 20 may be equipped with the testing device(s) for performing an examination of the examination item(s) that is offered by that vehicle 20.

The server 10 acquires information on users who are to have a physical exam from either or both of the database 15 and the terminal devices 30 used by the users. The users who are to have a physical exam are people who are supposed to have a physical exam, and include, for example, a person who should have a physical exam (person who has not had a physical exam he or she should have) and a person who wants to have a physical exam. The users who are to have a physical exam are hereinafter simply referred to as the "users." The information on the user includes an examination item(s) that should be included in the physical exam of the user or an examination item(s) the user wants to include in the physical exam, in addition to personal information such as the user's name, date of birth, and residence (location information). The information on the user may further include the user's preferred date and time of the physical exam, the time of day the user is home, and physical condition information of the user. The physical condition information of the user may include, for example, the trend of the user's physical condition depending on the time of day and/or weather conditions. For example, some users may tend to feel sick in the afternoon, or some users may tend to feel sick when the barometric pressure drops. The physical condition information may further include information on the user's current physical condition entered via the terminal device 30.

The server 10 selects the vehicles 20 that offer the examination items of the users based on the information on the users. The server 10 also determines a travel schedule for each vehicle 20 to travel around the users' residences, based on the information on the users. The travel schedule may include information on the arrival times of the vehicles 20 at the users' residences, durations of stay of the vehicles 20 at the users' residences, and the routes (travel routes) that are taken by the vehicles 20. The configuration and operation of the server 10 will be described in detail later.

The database 15 is a database in which information on the users who have a physical exam is accumulated. The database 15 may be a database of an administrative agency in which the residents' names, addresses, physical exam histories, etc. are accumulated, or may be a database in which physical exam histories of employees of a company affiliated with the system 1 and their family members are accumulated. The database 15 may further include a map database that stores map information. The map information includes road information that is necessary to determine the routes to be taken by the vehicles 20 to travel around the user's residences. The road information may include information on the distance between points on the road and information on the width of the road. The road information may include information on the speed limit and level of traffic congestion of the road that are necessary to determine the travel schedule. The level of traffic congestion estimated from the past levels of traffic congestion on the same day and same time of day.

Each vehicle 20 travels around the residences of the users who have a physical exam, based on the travel schedule set by the server 10. As will be described later, the vehicles 20 may perform automatic driving or adaptive cruise control.

Examinations of a plurality of examination items of each user are divided between or among a plurality of vehicles 20. In the present specification, performing examinations includes taking physical measurements, performing tests, and providing health consultation. For example, a first vehicle of the vehicles 20 performs measurements of the height, weight, waist circumference, and blood pressure. For example, a second vehicle of the vehicles 20 performs a vision test and a hearing test. For example, a third vehicle of the vehicles 20 performs a urine test and a blood test. For example, a fourth vehicle of the vehicles 20 performs chest X-ray and abdominal X-ray. Each vehicle 20 performs an examination(s) according to the examination item(s) that can be provided by that vehicle 20.

Depending on the number of users that have a physical exam and the examination items of the users, a plurality of vehicles 20 may be prepared for each examination item. The user can receive an examination(s) of the examination item(s) required for him or her in the vehicle(s) 20 selected from the vehicles 20 including the first to fourth vehicles. The combination of the vehicles 20 that travel around the users' residences varies depending on the examination items of the users. Since each vehicle 20 performs a part of the examination items of the physical exam, each vehicle 20 can be a relatively small vehicle unlike large-sized physical examination vehicles described in the related art.

Each vehicle 20 travels around the residences of the users who have a physical exam and performs an examination(s) on each user, based on the travel schedule determined by the server 10. The user's residence is the place where the user who has a physical exam is located. The user's residence includes a residence where the user lives and a facility where the user stays. The user's residence includes the user's address registered in the database of the administrative agency in the area where the user lives, or the place designated by the individual user via the terminal device 30. The user' residence may be registered in the database 15 or other system. The vehicles 20 are sequentially dispatched to a parking lot on the premises of the user's residence or a road next to the user's residence. Since the vehicles 20 are relatively small vehicles, the vehicles 20 can travel and park even on a relatively narrow road or premises.

Some vehicles 20 may be able to perform unmanned measurements and tests depending on the examination items that are offered by these vehicles 20. The user can get measured and tested according to instructions received from the vehicle 20. Some vehicles 20 may be configured to connect to the remote computer 50 via the network 40. The user can receive an examination by getting measured and tested while interacting with a healthcare worker such as a doctor who operates the remote computer 50. The number of remote computers 50 may be smaller than the number of vehicles 20. The vehicle 20 may be connected to an available remote computer 50 not connected to other vehicles 20, only when necessary to perform an examination. In the system 1, it is therefore not necessary to assign a healthcare worker to each vehicle 20, and healthcare workers' time can be efficiently used.

The terminal device 30 is a communication device used by the user who has a physical exam. The terminal device 30 is, for example, a mobile phone, a smartphone, a smart speaker, or a personal computer (PC). However, the terminal device 30 is not limited to these, and may be a desired device used by the user.

The terminal device 30 sends the user information regarding the physical exam to the server 10. For example, the terminal device 30 can use an application to send information such as an examination item(s) the user wants to include in the physical exam, the user's preferred date and time of examination, in addition to the user's basic information such as name and address. The terminal device 30 may receive information from the server 10. The information received from the server 10 includes travel plan information of each vehicle 20 to the user's residence, and a push notification that is sent when each vehicle 20 approaches the user's residence. The travel plan information of each vehicle 20 to the user's residence is information included in the travel schedule of the vehicles 20. The travel plan information of each vehicle 20 to the user's residence includes information on the scheduled arrival time of the vehicle 20 at the user's residence, and the scheduled duration of stay of the vehicle 20 at the user's residence for the examination(s) of the physical exam.

The network 40 is a desired communication network through which the server 10, the vehicle 20, the terminal device 30, and the remote computer 50 can communicate with each other. The network 40 may be a wireless or wired transmission line, or may be a communication network such as the Internet. For example, the network 40 in the present embodiment includes an ad hoc network, a metropolitan area network (MAN), a cellular network, a wireless personal area network (WPAN), a public switched telephone network (PSTN), a terrestrial wireless network, an optical network, other network, and any combination of these. Components of a wireless network include, for example, an access point (e.g., a Wi-Fi access point) and a femtocell. A wireless communication device can be connected to a wireless network using Wi-Fi (registered trademark), Bluetooth (registered trademark), cellular communication technology, or other wireless technology and technical standards.

According to the system 1, a plurality of vehicles 20 that offers the examination items of the users who have a physical exam travel around the residences of the users. The users can thus conveniently have a physical exam without moving from their residences. As a result, the percentage of population who receive a physical exam increases. The present embodiment is described on the assumption that the database 15 is connected to the network 40 of the system 1.

However, when the information accumulated in the database 15 is not used, the database 15 may not be connected.

Next, the configuration and operation (information processing method) of the server 10 will be described in detail.

Configuration of Server

Figure 2:
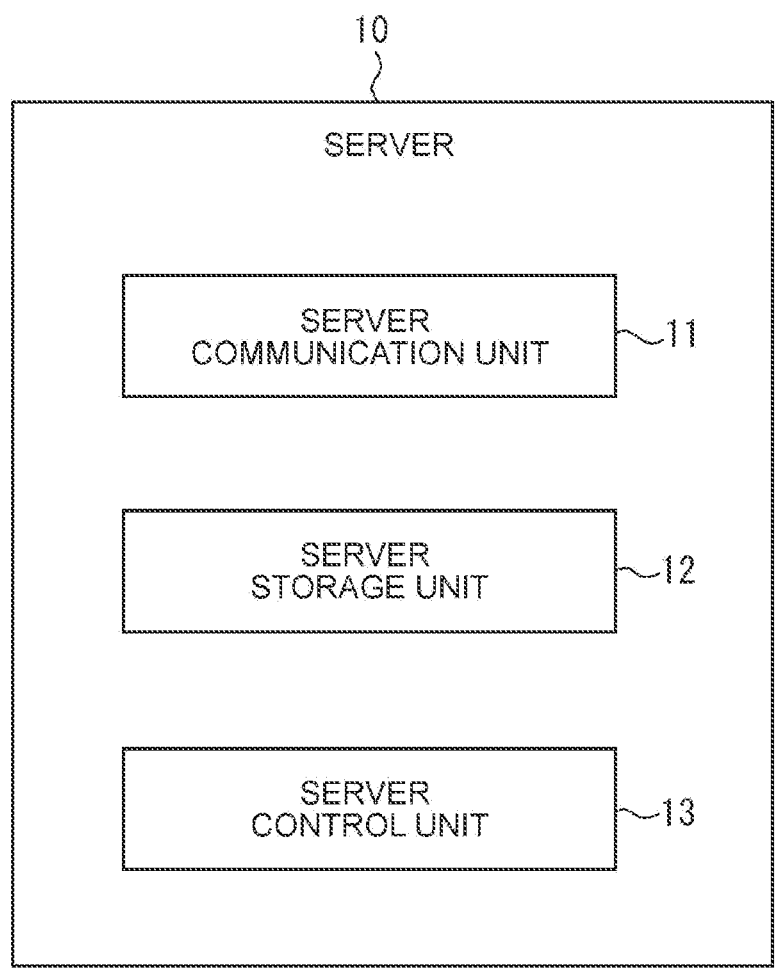
FIG. 2 shows an example of a configuration of a server according to the embodiment.

FIG. 2 shows an example of a configuration of the server 10 according to the embodiment. The server 10 includes a server communication unit 11, a server storage unit 12, and a server control unit 13.

The server communication unit (sometimes simply referred to as the "communication unit") 11 includes a communication module (a communication device) connected to the network 40. The communication module supports, for example, a mobile communication standard such as fourth generation (4G) and fifth generation (5G), a wired local area network (LAN) standard, or a wireless LAN standard. However, the standard supported by the communication module is not limited to these, and the communication module may support any desired communication standard. In the present embodiment, the server 10 is connected to the network 40 via the server communication unit 11. The server communication unit 11 receives (acquires) user information sent from the database 15 or the user's terminal device 30 via the network 40. The server communication unit 11 can also send information (e.g., a travel schedule) to the vehicle 20 or the user's terminal device 30 via the network 40.

The server storage unit (sometimes simply referred to as the "storage unit") 12 includes a semiconductor memory or a magnetic memory. The server storage unit 12 may function as, for example, a main storage device, an auxiliary storage device, or a cache memory. The server storage unit 12 stores desired information to be used for the operation of the server 10. For example, the server storage unit 12 may store a system program, an application program, and a management database. The information stored in the server storage unit 12 may be updatable with, for example, information acquired from the network 40 via the server communication unit 11.

In the present embodiment, the server storage unit 12 stores the user information acquired from either or both of the database 15 and the terminal device 30 used by the user. The server storage unit 12 also stores the correspondence between the examination items of the physical exam and the vehicles 20. The server storage unit 12 may further acquire map information from the database 15 and store it.

The server control unit (sometimes simply referred to as the "control unit") 13 includes one or more processors. In the present embodiment, the "processor" is a general-purpose processor or a dedicated processor specialized in specific processing. However, the processor is not limited to these. The server control unit 13 controls the overall operation of the server 10. For example, the server control unit 13 controls the server 10 based on the system program, application program, etc. stored in the server storage unit 12.

In the present embodiment, the server control unit 13 refers to the diagnostic items of the users included in the information on the users stored in the server storage unit 12 and the correspondence between the examination items and the vehicles 20, and selects the vehicles 20 to be dispatched for a physical exam. For example, when the server control unit 13 prepares for the next travel of a plurality of vehicles 20 to provide a physical exam, the server control unit 13 selects a plurality of vehicles 20 that offers the examination items of a plurality of users who is to have a physical exam. The server control unit 13 selects the vehicles 20 such that one or more vehicles 20 perform an examination(s) on each user according to the examination item(s) of that user. One vehicle 20 provides an examination(s) of the examination item(s) of one or more users.

The server control unit 13 determines a travel schedule of the selected vehicles 20 based on the positional relationship between or among the users' residences such that the selected vehicles 20 can efficiently travel around the users' residences. The server control unit 13 may determine the travel schedule of the vehicles 20 such that the overall usage efficiency of the vehicles 20 is maximized or such that the overall usage efficiency of the vehicles 20 is higher than a predetermined desired value. The server control unit 13 can schedule a plurality of vehicles 20 to travel around the users' residences on the same date. The server control unit 13 may determine the schedule such that different examinations are performed on one user on different dates depending on the examination items of the user. The determined travel schedule or information on a part of the determined travel schedule is sent to the vehicle 20 and the terminal device 30 via the server communication unit 11. The server control unit 13 may send information on the examination item(s) that is offered by each vehicle 20 to the terminal device 30 together with the travel schedule.

The server control unit 13 can receive operation information of the vehicle 20 (location information, travel speed, etc. of the vehicle 20) from each vehicle 20 via the server communication unit 11. The server control unit 13 may accumulate the operation information in the server storage unit 12, and may modify the travel schedule of the vehicle 20 as necessary based on the accumulated information. The server control unit 13 may send update information on the travel schedule of the vehicles 20, system program, application program, etc. to the vehicles 20 via the server communication unit 11.

Information Processing Method of Server

Figure 3:
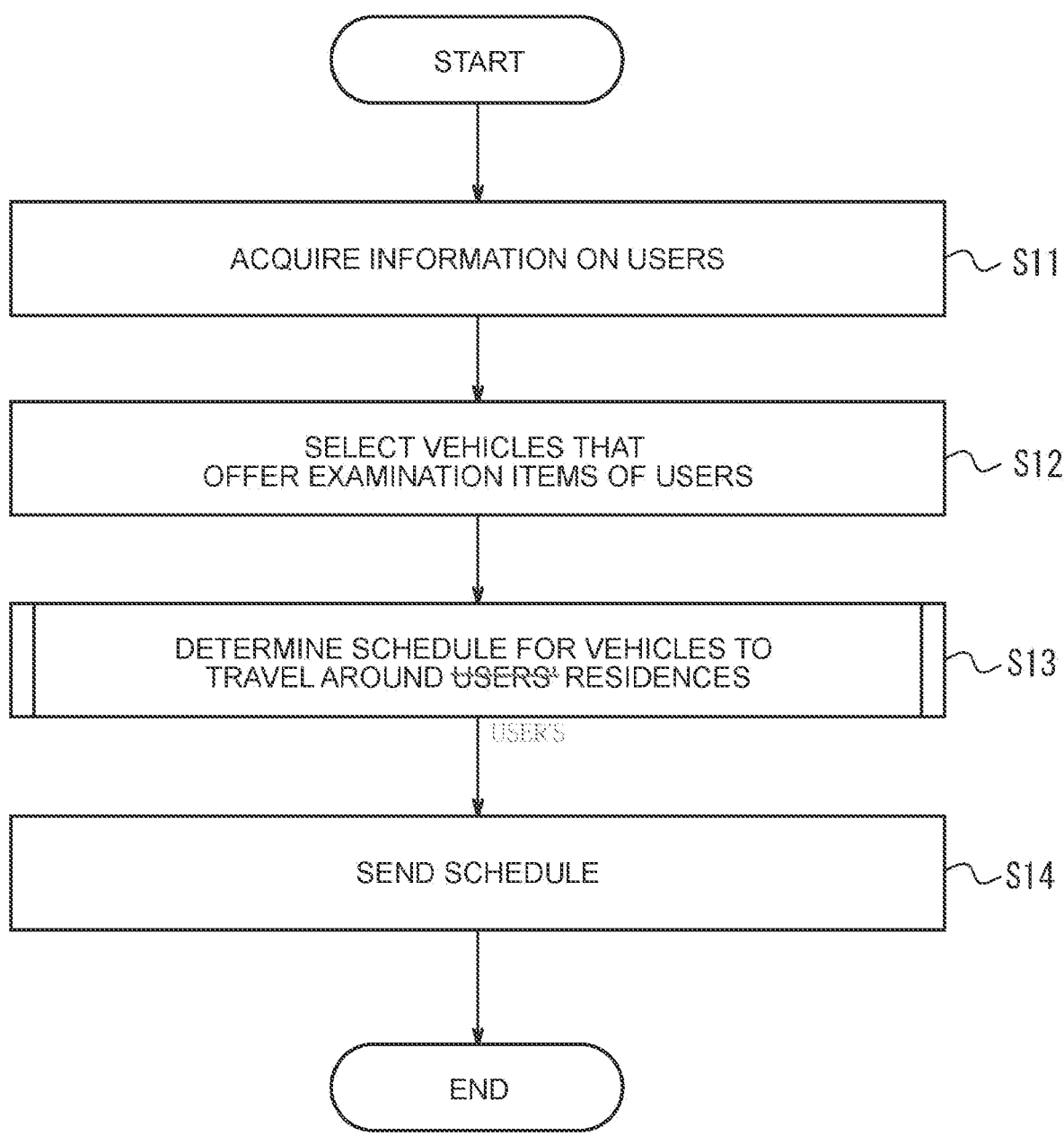
FIG. 3 is a flowchart showing an example of an information processing method of the server.

An example of the information processing method of the server 10 will be described with reference to the flowchart shown in FIG. 3. The server 10 performs the following steps S11 to S14 to determine the travel schedule of the vehicles 20 that offer an examination of each examination item and send the determined travel schedule or information on a part of the determined travel schedule to the vehicles 20 and the terminal devices 30.

Step S11: The server 10 acquires information on those users who are to have a physical exam from either or both of the database 15 and the terminal devices 30 of the users.

For example, the server 10 can connect to the database 15 in which information on users is accumulated via the network 40, and extract the information on the users who should receive a physical exam (such as people who has not had a physical exam for a predetermined period of time) from the database 15. The server 10 can receive information of those users who want to receive a physical exam from the terminal devices 30 used by the users. The information on each user includes at least one of the following three pieces of information: the examination item(s) of the user (the examination item(s) included in the physical exam of the user), the location information of the user's residence, and the user's preferred date and time of the physical exam. The server 10 stores the acquired information on the users in the server storage unit 12. The server 10 may register particularly the users who sent information from their terminal devices 30 as users who have a physical exam of the system 1.

Step S12: The server 10 selects the vehicles 20 that offer the examination items of the users based on the acquired information on the users. That is, the server 10 refers to the examination item(s) included in the physical exam of each user and the examination item(s) that is offered by each vehicle 20, and selects the vehicles 20 to be used for the physical exams of the users. The server 10 determines the types and number of vehicles 20 by considering the number of users and the examination item(s) of each user.

Figure 4:
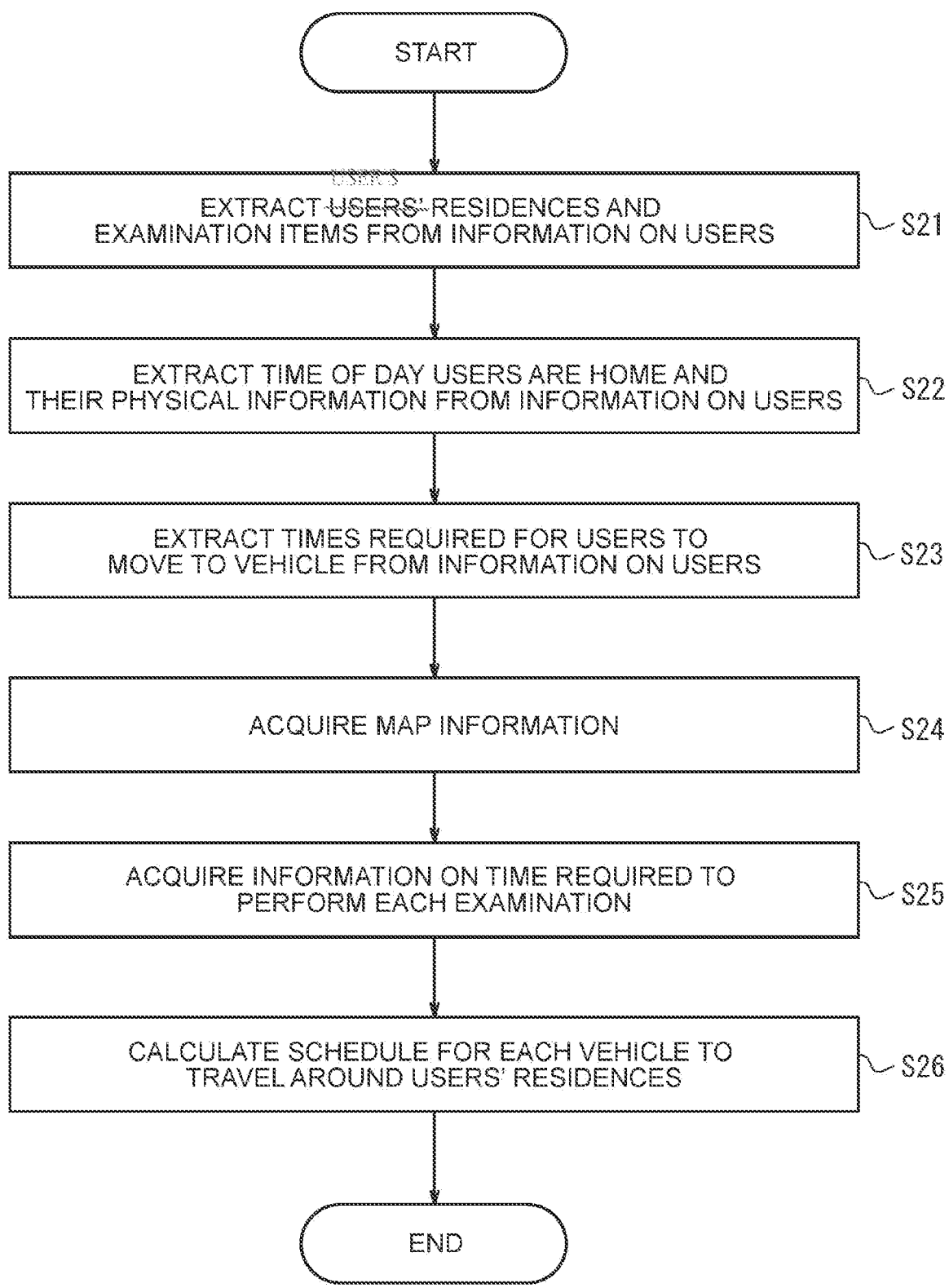
FIG. 4 is a flowchart showing an example of a method for determining a schedule for vehicles to travel around users' residences in FIG. 3.

Step S13: The server 10 then determines a travel schedule for the vehicles 20 to travel around the users' residences. The process of determining a travel schedule is performed by steps S21 to S26 illustrated in the flowchart of FIG. 4.

Step S21: The server 10 extracts the users' residences and examination items from the information on the users.

Step S22: The server 10 extracts information on what time of day the users are home and their physical condition information from the information on the users. Step S22 is not essential.

Step S23: The server 10 extracts the times required for the users to move to the vehicle 20 from the information on the users. Step S23 is not essential.

Step S24: The server 10 acquires the map information of the area including the residences of the users who have a physical exam from the database 15. The server 10 may acquire the map information from the database 15 in advance and store the acquired map information in the server storage unit 12.

Step S25: The server 10 acquires information on the time required to perform an examination of each examination item. Such information may be stored in the server storage unit 12 in advance.

Step S26: The server 10 calculates a travel schedule for each vehicle 20 to travel around the users' residences, based on the information acquired in steps S21 to S25.

Step S14: Referring back to FIG. 3, the server 10 sends the travel schedule calculated in step S26 to the vehicles 20 and the terminal devices 30. The server 10 may send a part of the travel schedule that relates to an individual vehicle 20 to that vehicle 20. The server 10 may send the arrival time of each vehicle 20 at an individual user's residence to the terminal device 30 of that user as examination time. The server 10 may send the time(s) required for an examination(s) of an individual user to the terminal device 30 of that user. The server 10 may send the examination item(s) that is offered by each vehicle 20 to the terminal device 30. The terminal device 30 presents the received information to the user. This allows each user to aware of when and what examination is scheduled for him or her.

Configuration of Vehicle

Figure 5:
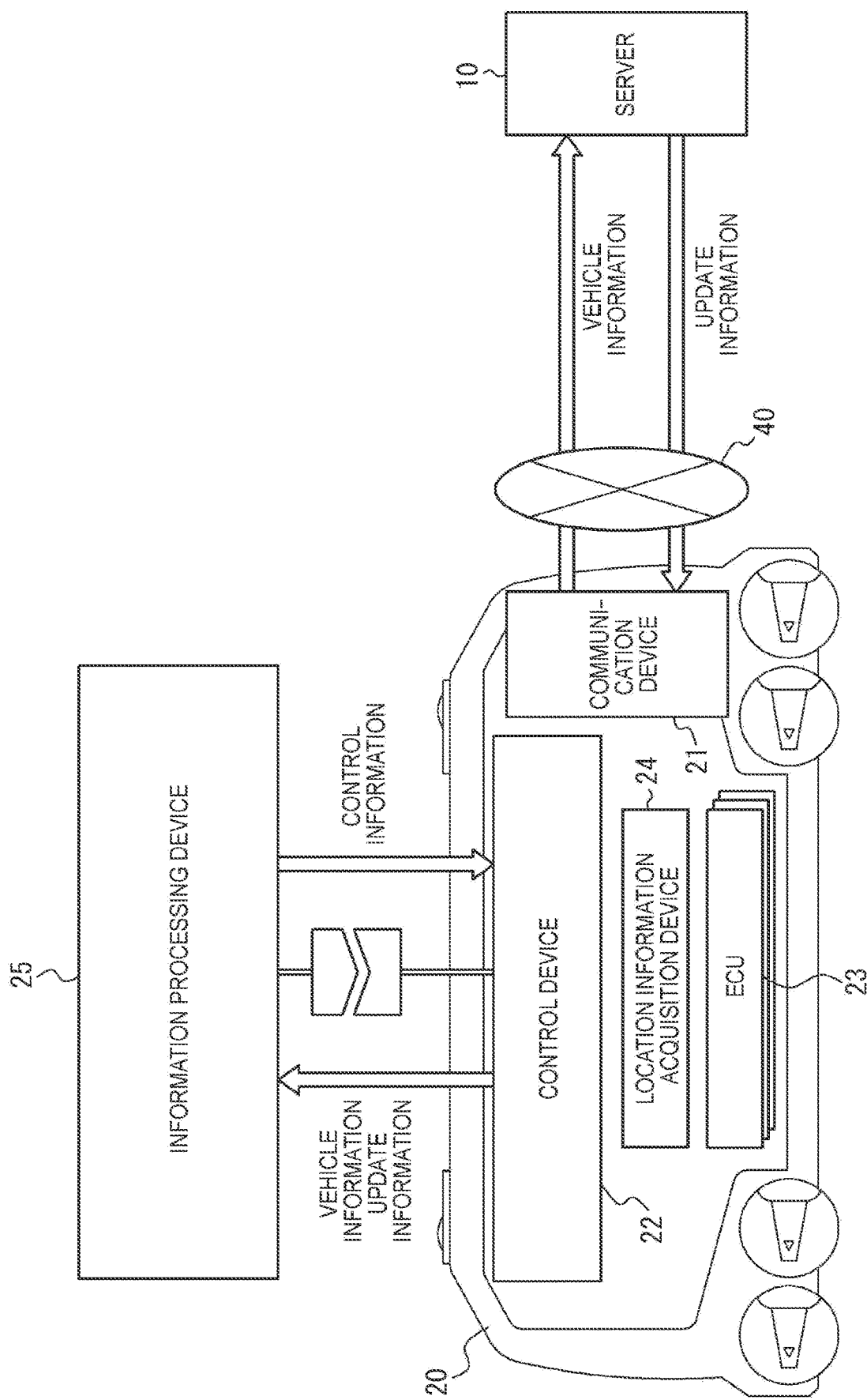
FIG. 5 shows an example of a configuration of a vehicle according to the embodiment.

FIG. 5 illustrates an example of a configuration of the vehicle 20 according to the present embodiment. The vehicle 20 includes an information processing device 25 that controls the vehicle 20 as an attached device. The vehicle 20, the information processing device 25, and the server 10 are connected via the network 40 such as the Internet.

The vehicle 20 is, for example, an automobile capable of autonomous driving or adaptive cruise control. However, the vehicle 20 is not limited to this, and may be any vehicle that can be equipped with equipment.

The vehicle 20 and the information processing device 25 cooperate to perform vehicle control for the vehicle 20. The information processing device 25 automatically generates control information by autonomous driving control software and sends the generated control information to the vehicle 20. The vehicle 20 performs the vehicle control based on the received control information. The vehicle control is, for example, autonomous driving, but is not limited to this. At least a part of an application programming interface (API) that defines the specifications of the control information is disclosed to a service provider. The service provider can program the autonomous driving control software of the information processing device 25 as desired using the disclosed API. Therefore, the service provider can provide a desired mobility service by installing equipment suitable for the purpose in the vehicle cabin of the vehicle 20 and programming the autonomous driving control software using the API suitable for the purpose.

In the present embodiment, such a vehicle 20 may be equipped with equipment used for a physical exam, and may move by automatic driving based on the travel schedule sent from the server 10.

The vehicle 20 includes a communication device 21, a control device 22, a plurality of electronic control units (ECUs) 23, and a location information acquisition device 24. The devices 21 to 24 are connected such that they can communicate with each other via, for example, an in-vehicle network such as a controller area network (CAN) or a dedicated line.

The communication device 21 may include an in-vehicle communication device such as a data communication module (DCM). The communication device 21 may include a communication module that supports a mobile communication standard such as fourth generation (4G) and fifth generation (5G) in order to connect to the network 40.

The control device 22 is a device that performs the vehicle control based on the control information received from the information processing device 25. The vehicle control is, for example, autonomous driving to a destination, but is not limited to this. The autonomous driving includes, for example, Levels 1 to 5 defined by the Society of Automotive Engineers (SAE). However, the autonomous driving is not limited to these, and may be defined as desired. The vehicle control is performed by the cooperation among the control device 22, each ECU 23, etc. The control device 22 includes a communication module that communicates with the information processing device 25, the communication device 21, and each ECU 23, one or more memories storing a system program, an application program, etc., and a control unit including one or more processors that control the overall operation of the control device 22.

For example, the control device 22 receives various kinds of vehicle information on the vehicle 20 (speed, location, autonomous driving state, etc.) from each ECU 23 etc. The control device 22 sends the vehicle information to the information processing device 25, and also sends the vehicle information to the server 10 via the communication device 21. The control device 22 receives update information for a system program etc. of the information processing device 25 from the server 10 via the communication device 21, and sends the update information to the information processing device 25. When the control device 22 acquires the control information from the information processing device 25, the control device 22 performs the vehicle control for the vehicle 20 based on the control information.

The ECUs 23 cooperate with the control device 22 to control the operation of the vehicle 20. Specifically, the ECUs 23 receive control commands based on the control information from the control device 22, and control the operation of the vehicle 20 according to the control commands. For example, the ECUs 23 control manipulated variables of the vehicle 20 to the values indicated by the control commands. At each control timing, the ECUs 23 collect measured values of controlled variables or manipulated variables of the vehicle 20 from various sensors mounted on the vehicle 20, and send the measured values to the control device 22.

The location information acquisition device 24 includes one or more receivers that supports a desired satellite positioning system. For example, the location information acquisition device 24 may include a Global Positioning System (GPS) receiver. The location information acquisition device 24 acquires a measured value of the location of the vehicle 20 as location information, and sends the location information to the control device 22.

The information processing device 25 includes: a communication module connecting to the control device 22 of the vehicle 20; one or more memories storing a system program, an application program, etc.; one or more sensors that detect information on the operation of the information processing device 25 or the surroundings environment; and a control unit including one or more processors that control the overall operation of the information processing device 25. The information processing device 25 is mounted on, for example, the rooftop of the vehicle 20. The position where the information processing device 25 is mounted is not limited to the rooftop, and may be mounted at any position outside the vehicle 20 or inside the vehicle cabin of the vehicle 20.

The information processing device 25 receives the vehicle information and the update information from the control device 22. The information processing device 25 generates control information based on the sensor information, the vehicle information, etc., and sends the control information to the control device 22. The application program stored in the memory can include autonomous driving control software. In this case, the information processing device 25 functions as an autonomous driving kit by the autonomous driving control software.

As a result, the vehicle 20 can perform autonomous driving or adaptive cruise control.

The vehicle 20 is equipped with a testing device(s) according to the examination item(s) that is offered by that vehicle 20. For example, the vehicle 20 is equipped with one or more testing devices selected from a stadiometer, a weight scale, an optometer, an audiometer, a sphygmomanometer, a urine analyzer, a hematology analyzer, an X-ray diagnostic imaging system, an ultrasound imaging system, an electrocardiograph, etc. The vehicle 20 may include a guidance device that guides the user to appropriately move according to the examination item. The guidance device includes a speaker and display that guide the user by voice and an image. Some testing devices may be configured to complete an examination in an unmanned manner without human intervention by causing the user to follow guidance.

The vehicle 20 may be equipped with a device such as a camera, a microphone, a display, or a speaker for interacting with a healthcare worker who is remotely located and operates the remote computer 50. For example, the user who gets tested may receive instructions regarding a posture, movement, etc. with respect to the testing device from a remotely located healthcare worker via the network 40. The user may consult with a remotely located doctor via the network 40.

A healthcare provider necessary for testing may ride in the vehicle 20. For example, a nurse may ride in the vehicle 20 to draw blood for a blood test.

Operation of Terminal Device

The terminal device 30 may have any configuration as long as it has, for example, a function to communicate via the network 40, a function to accept an input from the user, and a function to display various kinds of information.

Figure 6:
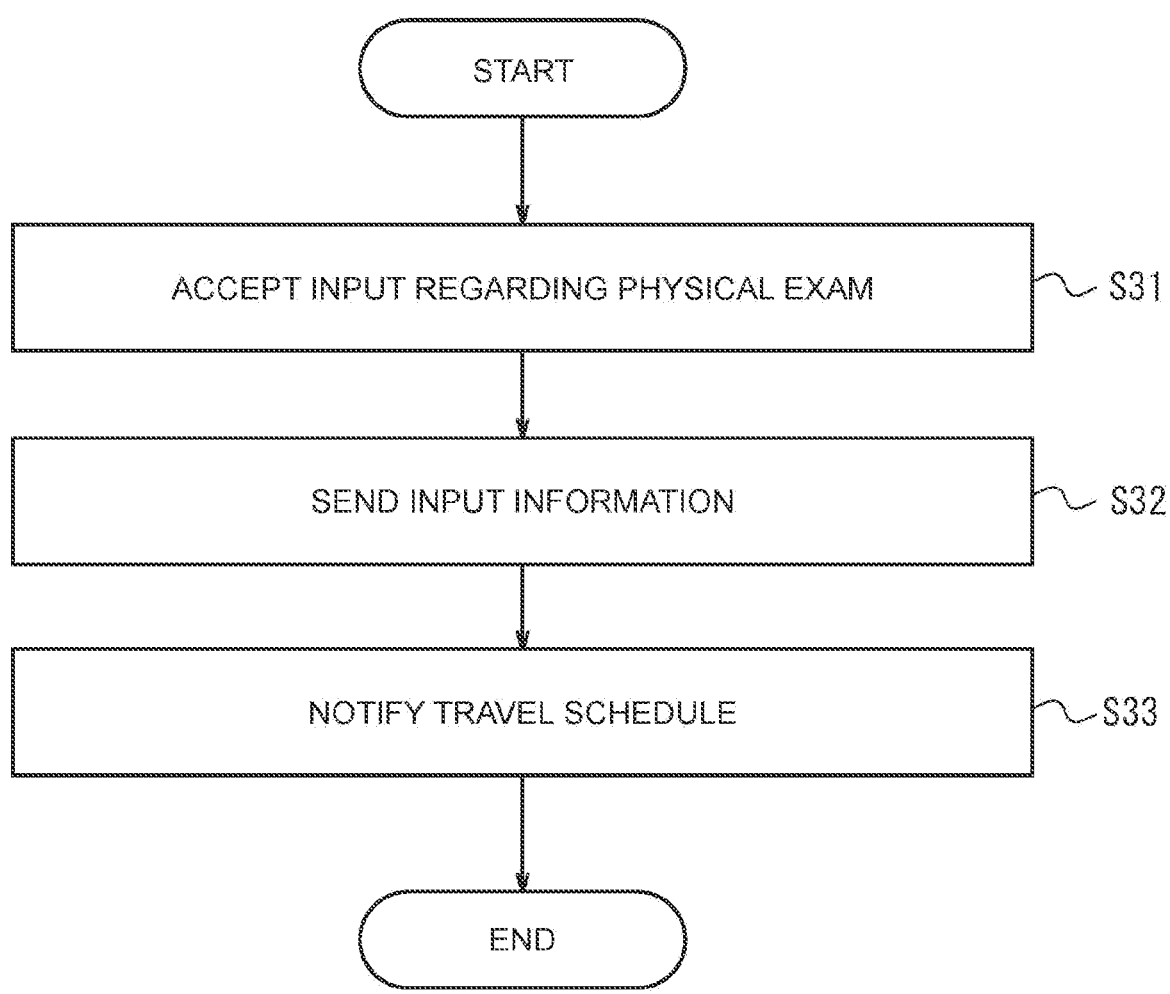
FIG. 6 is a flowchart showing an example of the operation of a terminal device.

FIG. 6 is a flowchart showing an example of the operation of the terminal device 30. The terminal device 30 performs the following steps S31 to S33.

Step S31: The terminal device 30 accepts an input regarding a physical exam from the user. The user can enter the input regarding a physical exam by, for example, opening a physical exam scheduling application installed in the terminal device 30. The application is downloaded from the server 10 in advance. When the application is opened, the terminal device 30 sends a request to display a physical exam scheduling screen to the server 10. The terminal device 30 displays a scheduling screen sent from the server 10 in response to the request. The user enters information on the scheduling screen, such that the terminal device 30 can accept the input regarding a physical exam the user wants to have.

Step S32: When the terminal device 30 accepts the input regarding a physical exam the user wants to have, the terminal device 30 sends the input information to the server 10 via the network 40. The input information that is sent to the server 10 may include information such as an examination item(s) (optional examination item(s)) the user wants to include in the physical exam and the user's preferred date and time of the physical exam, in addition to basic information such as the user's name and address indicating the user's residence. An examination item(s) the user wants to include in the physical exam may be entered individually. Alternatively, the terminal device 30 may be set such that a list of standard examination items is automatically selected and sent when the user selects a "general physical exam" on the input screen. Since the terminal device 30 can acquire location information based on, for example, a Global Positioning System (GPS) signal, the input information that is sent to the server 10 may include the current location information of the user's terminal device 30 instead of the user's address.

Step S33: Subsequently, when the terminal device 30 is notified of the travel schedule of the vehicles 20 that perform a physical exam on the user from the server 10, the terminal device 30 notifies the user of the start time(s) of an examination(s) of the physical exam, the time(s) required for the examination(s) of the physical exam, the examination item(s), etc. based on the travel schedule.

Figure 7:
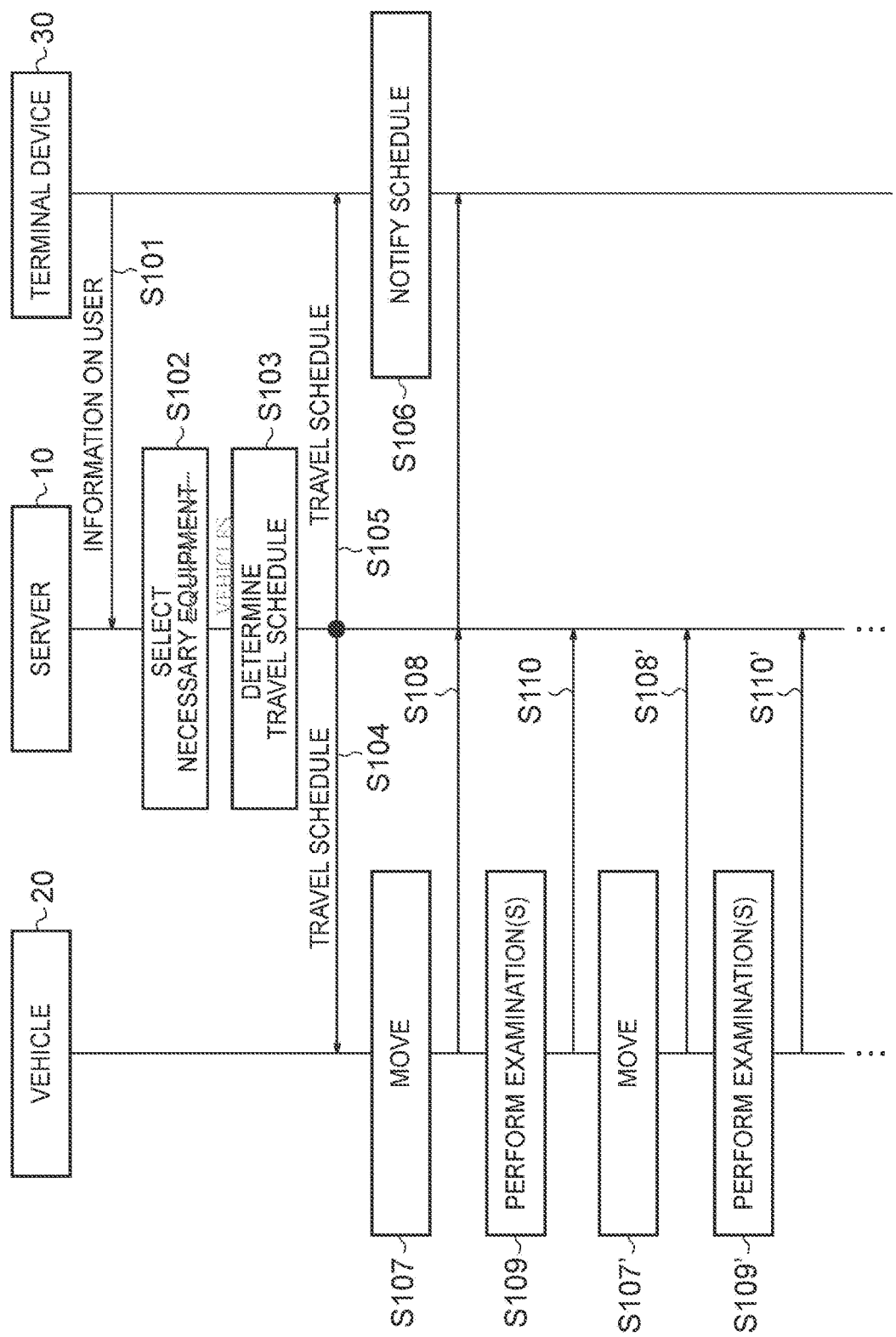
FIG. 7 is a sequence diagram showing an example of the overall operation of the system of the embodiment.

FIG. 7 is a sequence diagram showing an example of the overall operation of the system 1 of the present embodiment. The steps that are performed by the system 1 will be described below.

Step S101: The terminal device 30 sends the information on the user to the server 10. The information on the user may include, for example, an examination item(s) the user wants to include in the physical exam and the user's preferred date and time of the physical exam. The server 10 may also acquire information on those users who need a physical exam from the database 15 etc.

Step S102: The server 10 selects a plurality of vehicles 20 to be used for physical exams based on the information on a plurality of users (particularly the examination items). The vehicle 20 that are selected include a plurality of vehicles 20 of different types that offer different examination items, based on the examination items of the users.

Step S103: The server 10 determines a travel schedule for each vehicle 20 to travel around the users' residences. The server 10 considers various conditions such as the users' preferred times, what time of day the users are home, and the users' physical conditions.

Step S104: The server 10 sends the determined travel schedule to each vehicle 20. Each vehicle 20 receives at least a part of the travel schedule that relates to that vehicle 20.

Step S105: The server 10 sends information on a part of the determined travel schedule that relates to an individual user to the terminal device 30 of that user. The server 10 may send the start time(s) of an examination(s) of the physical exam and the time(s) required for the examination(s) the physical exam of an individual user to the terminal device 30 of that user. In addition to sending the travel schedule, the server 10 may send a push notification to the terminal device 30 when each vehicle 20 is located in the neighborhood of the user.

Step S106: The terminal device 30 notifies the user of the received travel schedule (start time(s) of an examination(s) of the physical exam and time(s) required for the examination(s) of the physical exam) by, for example, displaying on the screen.

Step S107: When scheduled time comes, the operation of the vehicles 20 is started based on the received travel schedule, and each vehicle 20 moves toward the user's residences.

Step S108: Each vehicle 20 sends its operation information including the location information, travel speed, etc. of the vehicle 20 to the server 10 while the vehicle 20 is traveling. When the vehicle 20 arrives at the user's residence, the vehicle 20 may send an arrival notification to the terminal device 30 either directly or via the server 10. The terminal device 30 may notify the user of the arrival of the vehicle 20.

Step S109: The user gets into the vehicle 20 and receives an examination(s) of the examination item(s) that is offered by that vehicle 20.

Step S110: The vehicle 20 can send the examination results to the server 10 such that the examination results are accumulated in the server 10. The vehicle 20 may store the examination results therein and send them to the server 10 after all the examinations scheduled for that vehicle 20 by the travel schedule are completed.

Steps S107' to S110': After S110, namely when the examination(s) of one user is completed, the vehicle 20 repeats the operation of moving toward the residence of the next user and performing an examination(s). Steps S107' to S110' represent operations similar to those of steps S107 to S110, respectively. The vehicle 20 repeats moving and performing an examination(s) until the examinations scheduled for the users by the travel schedule are completed.

Next, an example in which a plurality of vehicles 20 that offers different examination items travel around the users' residences to perform examinations will be described with reference to FIGS. 8 and 9.

It is herein assumed that users U1 to U5 whose residences are first to fifth points P1 to P5, respectively, receive an examination of a first examination item. It is also assumed that the users U1, U4 also receive an examination of a second examination item. The users U1 to U5 are included in a large number of users who have a physical exam using the system 1. The first examination item is a basic examination item that is included in a physical exam for everyone. The second examination item is an optional examination item the user wants to include in the physical exam, or an examination item that is added according to the user's age or medical history. When the examination items are different between or among a plurality of users, at least a part of the vehicles 20 that travel around the residences of the users who have different examination items is different from each other.

Figure 8:
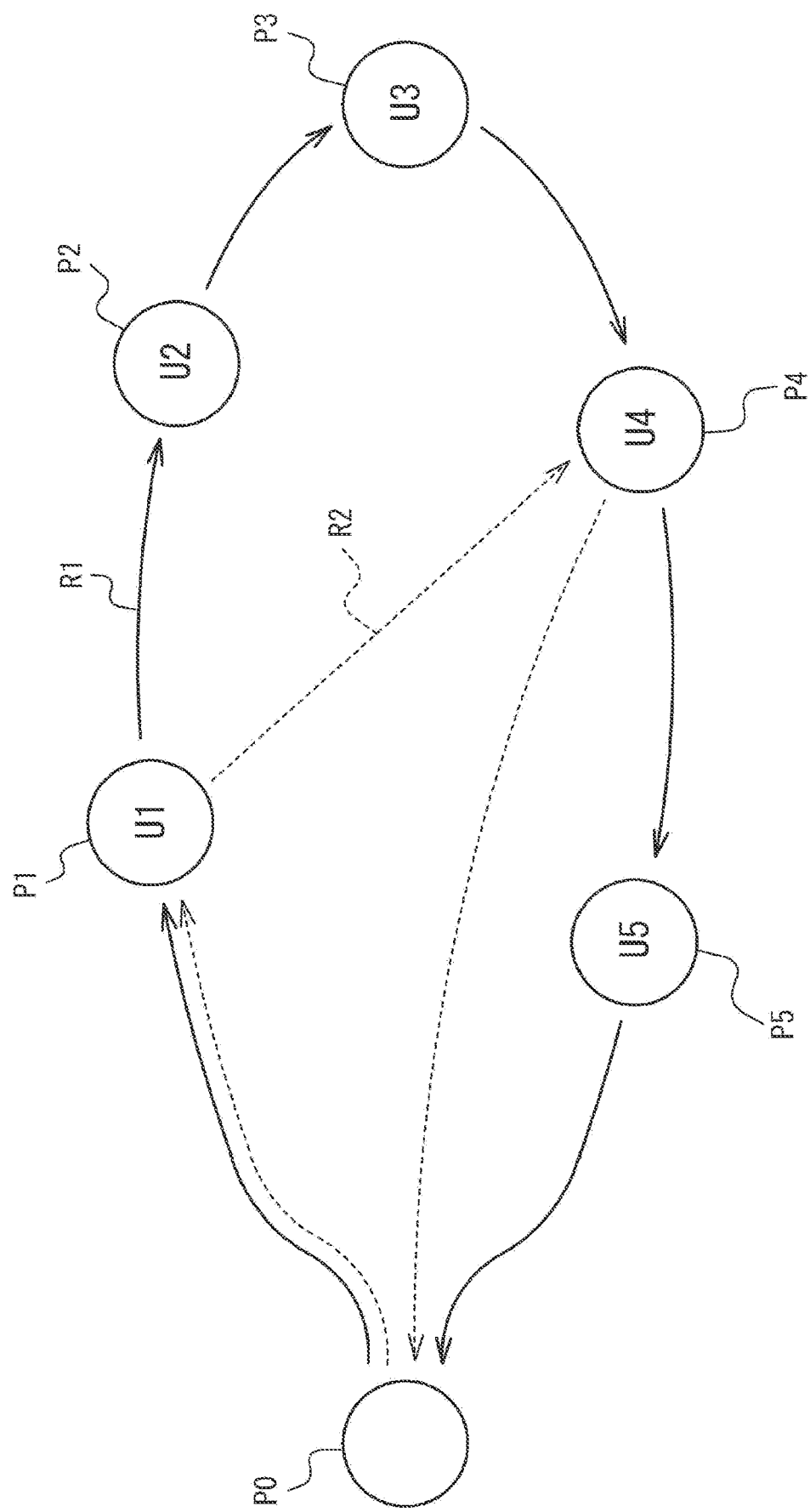
FIG. 8 shows an example of travel routes of vehicles determined by the server.
Figure 9:
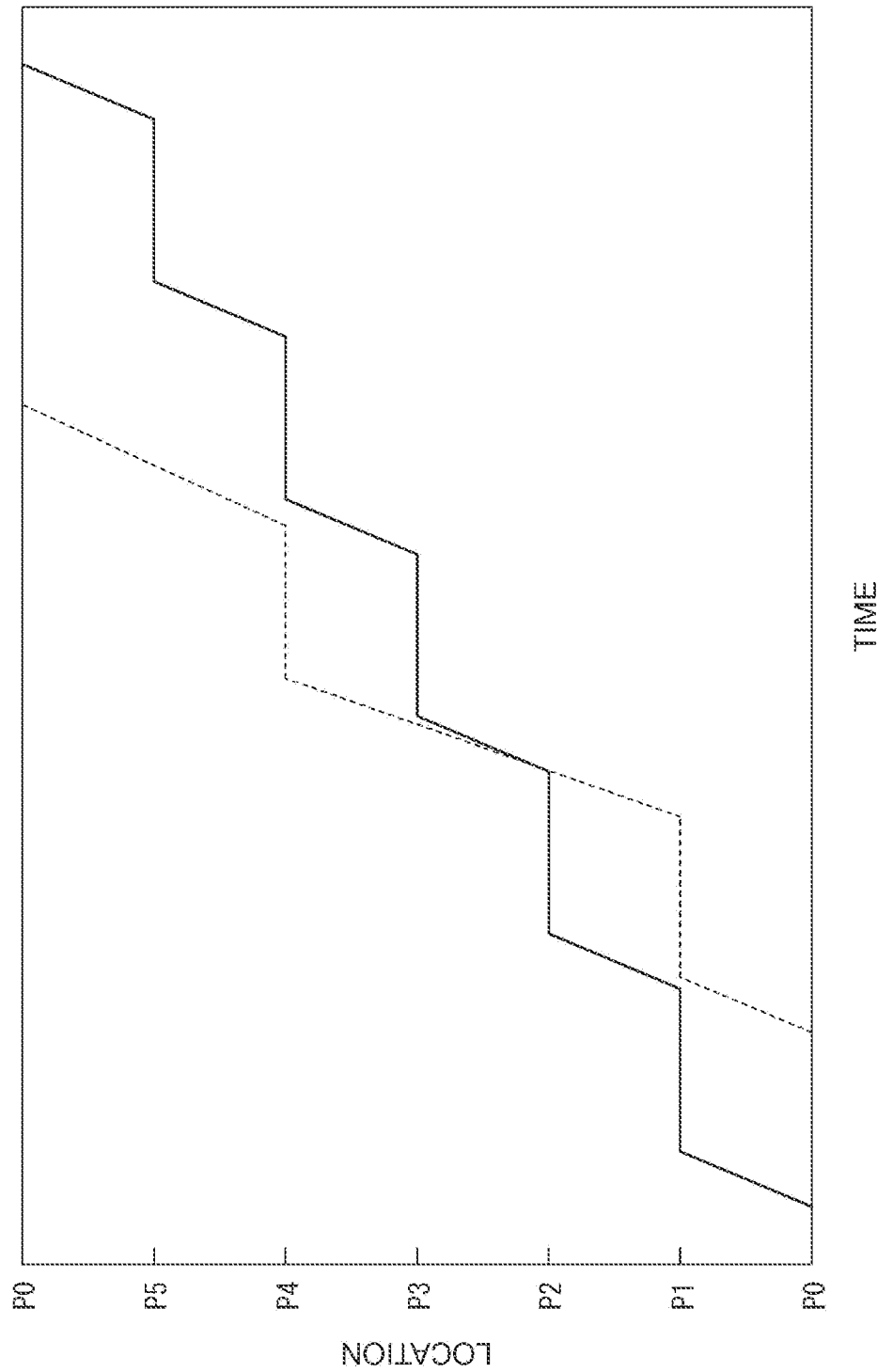
FIG. 9 shows the timings the vehicles shown in FIG. 8 travel to each user's residence to perform an examination.

As shown in FIG. 8, the server 10 can set a first travel route R1 for the vehicle 20 that performs an examination of the first examination item such that the vehicle 20 departs from a departure point P0, sequentially passes through the first to fifth points P1 to P5, and returns to the departure point P0. The departure point P0 is, for example, the base of the vehicle 20. The first travel route R1 is shown by continuous arrows in FIG. 8. The server 10 can also set a second travel route R2 for the vehicle 20 that performs an examination of the second examination item such that the vehicle 20 departs from the departure point P0, passes through the first point P1 and the fourth point P4, and returns to the departure point P0. The second travel route R2 is shown by dashed arrows in FIG. 8. The second travel route R2 may pass through the residence(s) of other user(s) not included in the first travel route R1. There may be other vehicle(s) 20 that performs an examination of an examination item(s) other than the first examination item and the second examination item. Such other vehicle(s) 20 is not shown in FIGS. 8 and 9.

The times the vehicle 20 gets to the points P1 to P5 are determined by considering the dates and times the users U1 to U5 prefer to receive a physical exam, what time of day the users U1 to U5 are home, the physical conditions of the users U1 to U5, etc. The server 10 may change the determined travel schedule when the user does not feel well and cannot receive a physical exam.

The server 10 determines the travel route of each vehicle 20, and at the same time, determines the schedule including the arrival times of each vehicle 20 at the points P1 to P5 and other points (if any), and the durations of stay of each vehicle 20 at the points P1 to P5 and other points (if any). FIG. 9 is a diagram showing an example of an operation schedule of two vehicles 20 that take the first travel route R1 and the second travel route R2 of FIG. 8. In FIG. 9, the operation schedule of the vehicle 20 that takes the first travel route R1 is shown by a continuous line. The operation schedule of the vehicle 20 that takes the second travel route R2 is shown by a dashed line.

The duration of stay of each vehicle 20 at each point P1 to P5 varies depending on the time required to perform the examination of the examination item that is offered by that vehicle 20. The duration of stay may be determined by considering the time required for the user to move to the vehicle 20 dispatched to the user's residence. The time required for the user to move to the vehicle 20 is, for example, the time required for the user to get into the vehicle 20 parked in front of the user's residence. The time required for the user to move to the vehicle 20 may be longer depending on the user's physical condition. The server 10 may acquire information on the time required for the user to move to the vehicle 20 in advance via the server communication unit 11.

When there is no parkable space on the premises of the user's residence or on the road next to the user's residence, the vehicle 20 may move to a place different from the user's residence such as a nearby parkable place after picking up the user. The server 10 may determine the travel schedule by predicting in advance the time required for the vehicle 20 to move to a parkable place based on the map information. When the examination of the user is completed, the vehicle 20 may return to the user's residence and drop off the user.

The server 10 determines the schedule such that the schedule for performing the examination of the first examination item on one user and the schedule for performing the examination of the second examination item on the same one user do not overlap. For example, in the example shown in FIG. 9, the two vehicles 20 are dispatched so as to first perform the examination of the first examination item and then the examination of the second examination item at the first point P1. The two vehicles 20 are dispatched so as to first perform the examination of the second examination item and then the examination of the first examination item at the fourth point P4.

The method for performing a physical exam provided by the system 1 of the present disclosure is significantly different from methods of related arts using large-sized physical examination vehicles. In the methods of related arts, a user moves to a place where one or more physical examination vehicles are parked and receives a physical exam. In the method of the present disclosure, a plurality of vehicles 20 that offers different examination items of a physical exam sequentially goes to users' residences and performs measurements, tests, health consultation, etc. necessary for the physical exam. A plurality of vehicles 20 that performs examinations on one user are dispatched to the user's residence at different times such that the examinations performed by the vehicles 20 do not overlap in time.

As described above, according to the present disclosure, the vehicles 20 that provide the examinations of the examination items of the users who need a physical exam travel around the users' residences to perform a physical exam. Therefore, the users can more easily receive a physical exam. The present disclosure makes it particularly easier for those users with disabilities that make it hard to move even a short distance to receive a physical exam. The convenience to the user is thus improved, and the percentage of population who receive a physical exam increases. As a result, physical exams become widespread, and the overall medical expenses of the society are reduced.

In the system 1 of the present disclosure, since a plurality of vehicles 20 each offering a part of the examination items required by the users travels around the users' residences, each vehicle 20 can be a relatively small vehicle. Therefore, the vehicles 20 can travel to the user's residence even in a restricted road environment such as a narrow road and a road with a height limit. As a result, the vehicles 20 can travel around many users' residences and perform a physical exam.

In the system 1 of the present disclosure, the server 10 determines the travel schedule such that only the vehicles 20 that offer the examination items required by the users travel around the users' residences. The server 10 can determine the travel schedule such that a plurality of vehicles 20 that offers different examination items is not dispatched to the user's residence in an overlapping period. This can increase the usage efficiency of the vehicles 20 and the testing equipment and devices mounted on the vehicle 20.

Moreover, in the present disclosure, the diagnostic equipment mounted on the vehicles 20 can be automated, and the user can interact with a remotely located healthcare worker such as a doctor via the network 40 when necessary. This allows the healthcare worker to give instructions for a test to the user who receives a physical exam in the vehicle 20, to consult with the user, etc. Since it is not necessary to assign a certain healthcare worker to each vehicle 20, human resources of healthcare workers can be effectively used.

The server 10 can be configured using a computer. Such a computer can be implemented by storing in a storage unit of the computer a program describing the content of the processing for implementing the functions of the server 10, and reading and executing this program by a central processing unit (CPU) of the computer. This program can be recorded on a computer-readable recording medium.

Although the above embodiment is described as a representative example, it is apparent to those skilled in the art that many modifications and substitutions can be made within the spirit and scope of the present disclosure. Therefore, the present disclosure should not be construed as being limited by the above embodiment, and various modifications or alterations can be made without departing from the scope of the claims. For example, a plurality of constituent blocks described in the embodiment may be combined into one block, or one constituent block may be divided into a plurality of blocks.

What is claimed is:

1. A server, comprising:
a communication device configured to acquire user information related to a physical examination to be taken by each user of a plurality of users, the user information indicating a residence of each user and one or more examination items required by each user; and
one or more processors configured to
determine a travel schedule of each vehicle of a plurality of vehicles to be dispatched to vicinity of the residence for enabling a combination of the plurality of vehicles to provide all of the one or more examination items, each vehicle being equipped with one or more diagnostic devices to conduct at least one of the one or more examination items and a guidance device configured to output sounds and screens guiding a user from among the plurality of users in operating the one or more diagnostic devices, and
transmit the travel schedule to the plurality of vehicles, wherein
each vehicle is configured to
receive the travel schedule, and
perform autonomous driving to travel along with the received travel schedule.

2. The server according to claim 1, wherein the one or more processors are configured to determine the travel schedule based on a positional relationship between or among residences of the plurality of users.

3. The server according to claim 1, wherein the one or more processors are configured to, when the vehicles dispatched to vicinity of a first residence of a first user among the plurality of users include at least one vehicle that is not included in vehicles dispatched to vicinity of a second residence of a second user among the plurality of users when examination items are different between or among the users, determine the travel schedule in such a manner that at least a part of the vehicles that travel around the residences of the users who receive the different examination items is required by the first user and the second user are different from each other.

4. The server according to claim 1, wherein:
the communication device is configured to acquire time information on what time of day each user is home; and
the one or more processors are configured to determine the travel schedule based on the acquired time information.

5. The server according to claim 1, wherein:
the communication device is configured to acquire physical condition information indicating physical condition of each user; and
the one or more processors are configured to determine the travel schedule based on the physical condition information.

6. The server according to claim 1, wherein:
the communication device is configured to acquire moving time required for each user to move to a vehicle dispatched to the vicinity of the residence; and
the one or more processors are configured to determine the travel schedule by considering the moving time.

7. The server according to claim 1, wherein the one or more processors are configured to optimize the travel schedule to maximize usage efficiency of the plurality of vehicles.

8. The server according to claim 1, wherein the one or more processors are configured to determine the travel schedule based on time required to conduct the examination items in each vehicle.

9. The server according to claim 1, wherein each vehicle is equipped with a camera, a microphone, a display and a speaker and is configured to connect with a remote computer, allowing the plurality of the users receive instructions in operating the one or more diagnostic devices from a healthcare worker located remotely.

10. The server according to claim 1, further comprising memory storing a user database, wherein
the one or more processors are configured to extract information about users from among the plurality of users who have not taken the physical examination for a predetermined period of time, and
the communication device is configured to acquire the user information about the users extracted from the user database.

11. The server according to claim 1, wherein the diagnostic devices include a stadiometer, a weight scale, an optometer, an audiometer, a sphygmomanometer, a urine analyzer, a hematology analyzer, an X-ray diagnostic imaging system, an ultrasound imaging system, and an electrocardiograph.

12. A system, comprising:
a plurality of vehicles; and
a server including a communication device and one or more processors, wherein
the communication device is configured to acquire user information related to the physical examination to be taken by each user of a plurality of users, the user information indicating a residence of each user and one or more examination items required by each user,
the one or more processors configured to
determine a travel schedule of each vehicle of the plurality of vehicles to be dispatched to vicinity of the residence for enabling a combination of the plurality of vehicles to provide all of the one or more examination items,
transmit the travel schedule to the plurality of vehicles, and
each vehicle is equipped with one or more diagnostic devices to conduct at least one of the one or more examination items of a physical examination and a guidance device configured to output sounds and screens guiding a user from among the plurality of users in operating the one or more diagnostic devices, and is configured to
receive the travel schedule, and
perform autonomous driving to travel along with the received travel schedule.

13. An information processing method executed by a server, comprising:
- acquiring user information related to a physical examination to be taken by each user of a plurality of users, the user information indicating a residence of each user and one or more examination items required by each user; and
- determining a travel schedule of each vehicle of a plurality of vehicles dispatched to vicinity of the residence or nearby for enabling a combination of the plurality of vehicles to provide all of the one or more examination items, each vehicle being equipped with one or more diagnostic devices to conduct at least one of the one or more examination items and a guidance device configured to output sounds and screens guiding a user from among the plurality of users in operating the one or more diagnostic devices, and
- transmitting the travel schedule to the plurality of vehicles, wherein
- each vehicle is configured to
  - receive the travel schedule, and
  - perform autonomous driving to travel along with the received travel schedule.

\* \* \* \* \*